J. R. ELLIS.
RESILIENT WHEEL.
APPLICATION FILED SEPT. 16, 1914.
1,157,855.
Patented Oct. 26, 1915.
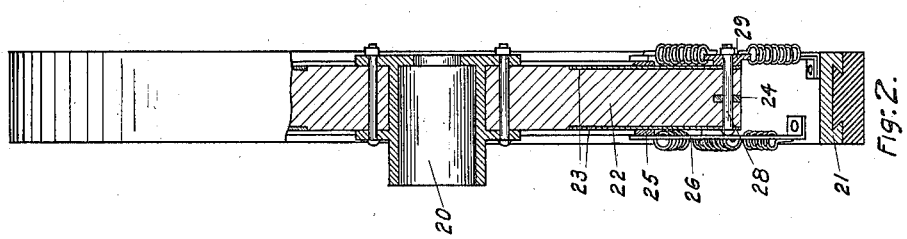
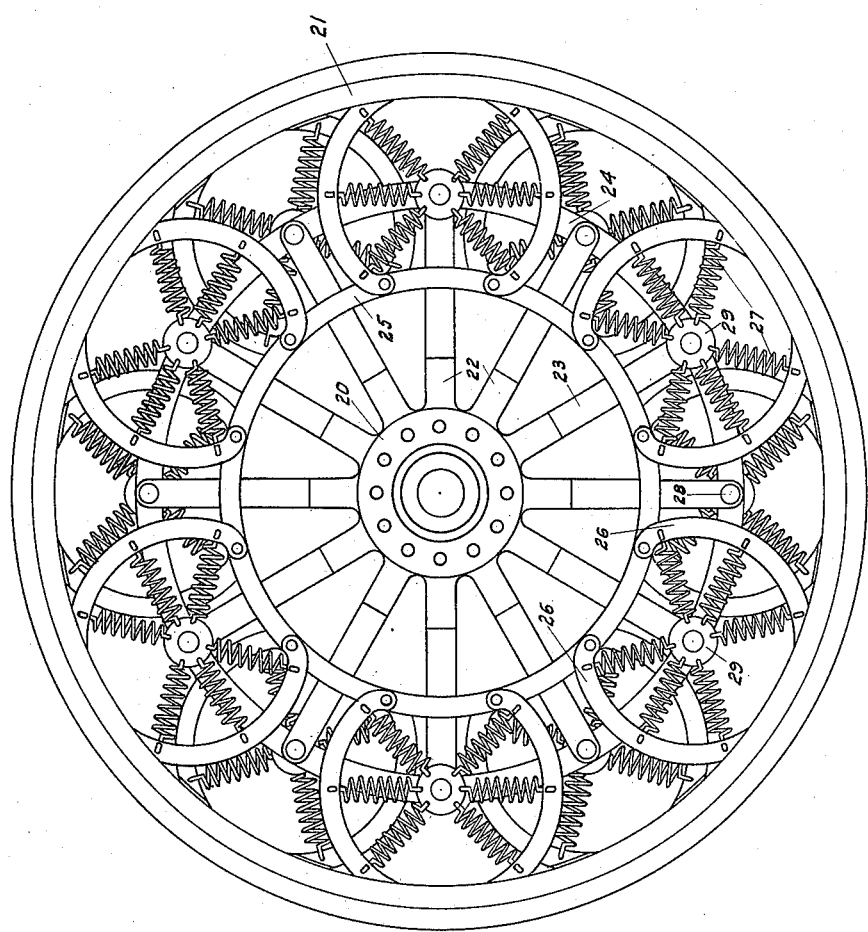
WITNESSES:
Ezra B Smith
Ruth E. Jetterwall
INVENTOR.
John R. Ellis
BY
Chamberlin Freudenreich
ATTORNEYS.

UNITED STATES PATENT OFFICE.

JOHN R. ELLIS, OF MEMPHIS, TENNESSEE.

RESILIENT WHEEL.

1,157,855.

Specification of Letters Patent.

Patented Oct. 26, 1915.

Application filed September 16, 1914. Serial No. 861,940.

*To all whom it may concern:*

Be it known that I, JOHN R. ELLIS, a citizen of the United States, residing at Memphis, county of Shelby, State of Tennessee, have invented a certain new and useful Improvement in Resilient Wheels, and declare the following to be a full, clear, and exact description of the same, such as will enable others skilled in the art to which it pertains to make and use the same, reference being had to the accompanying drawings, which form a part of this specification.

My invention has for its object to produce a simple and novel steel structure which will effectively absorb shocks without requiring the use of a pneumatic tire.

A further object of my invention is to produce a simple and novel resilient wheel which cannot easily get out of order and which will continue, in an emergency, to give service even though a considerable part of its resilient elements be damaged or destroyed.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side elevation of a wheel arranged in accordance with one form of my invention. Fig. 2 is a view partly in section along a plane containing the axis and partly in elevation.

Referring to the drawings 20 represents the hub of a wheel, 21, having a rim of any suitable construction. The hub has attached thereto radial spokes, 22, shorter than the distance between the hub and the rim. The wheel center, including the hub and the spokes, may, if desired, be similar to the wheel center of an ordinary artillery wheel, having its spokes cut off at the outer ends. In the arrangement shown, each of the spokes is protected on its outer sides with metal wearing plates, 23, and the outer ends of the spokes are tied together by a metal ring, 24, surrounding the entire set of spokes and set into slots in the ends of the spokes so as to bring its periphery flush with the outer ends of the spokes. On opposite sides of the wheel center are two rings or bands, 25, concentric with the hub and rim and of a radius considerably smaller than the radial length of one of the spokes, so as to let the outer ends of the spokes project beyond the rings or bands. Each of the rings or bands, 25, is connected to the rim by suitable curved metal bars or arms, 26, each of which is rigidly secured at one end to the rim and at its other end to one of the rings or bands. In the arrangement shown the members 26 are arranged in pairs, the concave sides of the members in each pair facing each other and thus forming with the bands and the rim a series of closed frames or irregular rings. The frames or rings thus formed are spaced apart an angular distance equal to twice the angle between consecutive spokes so that there will be on each side of the wheel only half as many of the frames or rings as there are spokes. The frames or rings on opposite sides are staggered so that the center of each is just halfway between the centers of the two adjacent ones on the opposite side of the wheel. This arrangement provides a series of frames or rings corresponding in number and spacing to the spokes.

In each of the frames or rings formed by the members 26, the rings 25 and the rim, there is a series of small radial springs, 27, having their outer ends secured to the frame or ring, preferably to the members 26 thereof, and having their inner ends secured in some way to the outer end of the corresponding spoke. In the arrangement shown, each spoke has passing through the outer end a bolt, 28, which extends through the wearing plates, 23, through the material of which the spoke is made, and through the stiffening ring, 24, and has on one end a flanged collar, 29, to the flange of which the inner ends of the springs are secured in any desired way. It will thus be seen that the wheel center is hung upon a large number of comparatively small springs, the springs of each group being independent of the other groups, but all coöperating to give a resilient yieldable support to the wheel center; and, because of the large number of comparatively small springs, a very effective cushion is obtained and shocks, whether large or small, are effectively absorbed and the wheel gives substantially the same results as those obtained by pneumatic tires instead of being practically stiff and unyieldable under small shocks as is generally the case with spring wheels.

It will of course be understood that additional resiliency may be obtained by the use of tires of any kind, so that when I refer to the resiliency of the wheel, it is without contemplating such resiliency as may be obtained through the use of resilient tires.

While I have illustrated and described in detail only a preferred form of my invention, I do not desire to be limited to the particular structural details thus illustrated and described; but I intend to cover all forms and arrangements which come within the terms employed in the definitions of my invention constituting the appended claims.

I claim:

1. In a wheel, a rim, a wheel center smaller in diameter than the rim, and two series of groups of springs arranged between the wheel center and the rim, each of said groups comprising a plurality of radiating springs secured at their inner ends to the wheel center and anchored at their outer ends to the rim, the two series being spaced apart axially of the wheel.

2. In a wheel, a rim, a wheel center smaller in diameter than the rim, and two series of groups of springs arranged between the wheel center and the rim, each of said groups comprising a plurality of radiating springs secured at their inner ends to the wheel center and anchored at their outer ends to the rim, the two series being spaced apart in the direction parallel to the axis of the wheel, and the several groups of one series alternating with the groups of the other series in the circumferential direction.

3. In a wheel, a rim, a wheel center smaller in diameter than the rim, two series of frame-like structures extending inwardly from the rim on opposite sides of the wheel center and overlapping the outer portion of the wheel center, and a series of radiating springs arranged within each of said frame-like structures and connected at their inner ends to the wheel center at a distance from the rim approximately equal to the length of one of the springs.

4. In a wheel, a rim, a hub, two rings lying between the hub and the rim and spaced apart from each other in the axial direction, members connecting each of said rings to the rim and forming therewith two series of frame-like structures, spokes extending from the hub between said rings, there being as many spokes as there are frame-like structures, and a plurality of springs connected to each of said spokes at about the middle of the corresponding frame-like structure and radiating to anchoring points on that structure.

5. In a wheel, a rim, a hub, two rings lying between the hub and the rim and spaced apart from each other in the axial direction, members connecting each of said rings to the rim and forming therewith two series of frame-like structures, spokes extending from the hub between said rings, there being as many spokes as there are frame-like structures, and a spring cushion in each of said frame-like structures connected to the corresponding spoke at about the center of that frame-like structure.

6. In a wheel, a rim, a wheel center smaller in diameter than the rim, and two series of groups of springs arranged between the wheel center and the rim, each of said groups comprising a plurality of springs each secured at one end to the wheel center and at its other end to the rim, the two series being spaced apart axially of the wheel.

7. In a wheel, a rim, a hub, two series of connected frame-like structures connected to and disposed along the rim, the two series being spaced apart axially of the wheel and alternating with each other in the circumferential direction, spring cushions within each of said frame-like structures, and a spoke extending from the hub to each of said spring cushions.

In testimony whereof, I sign this specification in the presence of two witnesses.

JOHN R. ELLIS.

Witnesses:
H. G. FERREE,
G. H. GLENDENING.

Copies of this patent may be obtained for five cents each, by addressing the "Commissioner of Patents, Washington, D. C."